United States Patent
Claes et al.

(10) Patent No.: US 9,826,681 B2
(45) Date of Patent: Nov. 28, 2017

(54) EXPANSION DEVICE FOR A BULK MATERIAL CONTAINER

(71) Applicant: CLAAS SELBSTFAHRENDE ERNTEMASCHINEN GMBH, Harsewinkel (DE)

(72) Inventors: Ulrich Claes, Halle-Westfalen (DE); Thomas Roewekamp, Wallenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 315 days.

(21) Appl. No.: 14/657,111

(22) Filed: Mar. 13, 2015

(65) Prior Publication Data

US 2015/0272000 A1    Oct. 1, 2015

(30) Foreign Application Priority Data

Mar. 28, 2014    (DE) ........................ 10 2014 004 481

(51) Int. Cl.
*A01D 75/00*    (2006.01)
*A01D 41/12*    (2006.01)
*A01D 41/00*    (2006.01)
*A01F 12/60*    (2006.01)

(52) U.S. Cl.
CPC ......... *A01D 41/1226* (2013.01); *A01D 41/00* (2013.01); *A01F 12/60* (2013.01)

(58) Field of Classification Search
CPC ................ A01D 41/1226; A01D 41/00; A01D 41/1208; A01F 12/60; B60J 7/141

USPC ........ 296/15, 100.09, 100.1, 100.15; 460/23, 460/119; 56/473.5; 220/666, 6, 7, 220/9.1–9.4
See application file for complete search history.

(56) References Cited

U.S. PATENT DOCUMENTS

| | | | | |
|---|---|---|---|---|
| 816,186 | A | * | 3/1906 | Roberts .................. A01D 46/26 56/329 |
| 2,551,239 | A | * | 5/1951 | Bond ....................... B60J 7/141 296/100.1 |

(Continued)

FOREIGN PATENT DOCUMENTS

| | | | | |
|---|---|---|---|---|
| DE | 4120731 | A1 | * 12/1992 | ......... A01D 41/1226 |
| DE | GB 2296175 | A | * 6/1996 | ......... A01D 41/1226 |

(Continued)

*Primary Examiner* — Robert Pezzuto
*Assistant Examiner* — Joan D Misa
(74) *Attorney, Agent, or Firm* — Michael J. Striker; Elizabeth C. Richter

(57) ABSTRACT

An expansion device for a bulk goods container includes a frame, a plurality of wall panels that are connected to the frame in an articulated manner to pivot outwardly such that a pivoted-out position delimit an interior space of the expansion device, connecting elements that are connected in an articulated manner to the wall panels at two edges of the connecting elements and first expansion elements that are connected in an articulated manner to an upper edge of the wall panels and are configured to pivot between a position resting against the wall panels and a position that extends the wall panels. The position extending the wall panels, flexible membrane elements are tensioned between the first expansion elements.

13 Claims, 4 Drawing Sheets

(56) References Cited

U.S. PATENT DOCUMENTS

| | | | | | |
|---|---|---|---|---|---|
| 3,485,524 | A * | 12/1969 | Nelson | | B60P 7/04 |
| | | | | | 105/377.07 |
| 4,585,266 | A * | 4/1986 | Steinberg | | A01C 3/06 |
| | | | | | 105/377.05 |
| 5,056,859 | A * | 10/1991 | Walder | | B60P 3/42 |
| | | | | | 296/100.07 |
| 5,151,064 | A * | 9/1992 | Damman | | A01D 41/1226 |
| | | | | | 460/119 |
| 6,074,298 | A * | 6/2000 | Majkrzak | | A01D 41/1226 |
| | | | | | 460/119 |
| 6,206,779 | B1 * | 3/2001 | Gerber | | A01C 15/005 |
| | | | | | 414/502 |
| 6,402,224 | B1 * | 6/2002 | Monaco | | B60J 7/141 |
| | | | | | 296/100.06 |
| 6,508,705 | B1 * | 1/2003 | Van Overschelde | | A01D 41/1226 |
| | | | | | 296/15 |
| 6,679,772 | B2 * | 1/2004 | Johnson | | A01D 41/1226 |
| | | | | | 414/502 |
| 6,938,960 | B1 * | 9/2005 | Eby | | B60J 7/1621 |
| | | | | | 296/100.08 |
| 7,037,034 | B2 * | 5/2006 | Dillingham | | A01C 15/006 |
| | | | | | 296/100.1 |
| 7,645,109 | B2 * | 1/2010 | Stukenholtz | | A01D 41/1226 |
| | | | | | 220/6 |
| 7,918,720 | B2 | 4/2011 | Mohr et al. | | |
| 8,029,346 | B2 * | 10/2011 | Sprau | | A01D 41/1226 |
| | | | | | 460/119 |
| 8,113,565 | B2 | 2/2012 | Zeuner et al. | | |
| 2003/0078085 | A1 * | 4/2003 | Gerber | | A01D 41/1226 |
| | | | | | 460/119 |
| 2003/0232634 | A1 * | 12/2003 | Johnson | | A01D 41/1226 |
| | | | | | 460/119 |
| 2004/0033823 | A1 * | 2/2004 | Stephens | | B60J 7/102 |
| | | | | | 460/119 |
| 2004/0254003 | A1 * | 12/2004 | Colpaert | | A01D 41/1208 |
| | | | | | 460/119 |
| 2009/0215509 | A1 * | 8/2009 | Johnson | | A01D 41/1226 |
| | | | | | 460/23 |
| 2009/0270149 | A1 * | 10/2009 | Sprau | | A01D 41/1226 |
| | | | | | 460/119 |
| 2010/0285854 | A1 * | 11/2010 | Temple | | A01D 41/1208 |
| | | | | | 460/119 |
| 2013/0196725 | A1 * | 8/2013 | Bossuyt | | A01D 41/1226 |
| | | | | | 460/119 |
| 2013/0252681 | A1 * | 9/2013 | Cooksey | | A01D 41/1226 |
| | | | | | 460/119 |
| 2013/0296005 | A1 * | 11/2013 | Claes | | A01D 41/1226 |
| | | | | | 460/119 |
| 2015/0148112 | A1 * | 5/2015 | Ducroquet | | A01D 41/1226 |
| | | | | | 460/119 |
| 2016/0360696 | A1 * | 12/2016 | Vandevelde | | E05F 15/53 |

FOREIGN PATENT DOCUMENTS

| | | | | |
|---|---|---|---|---|
| DE | EP 1203524 A1 * | 5/2002 | | A01D 41/1226 |
| DE | 102007003653 | 7/2008 | | |
| DE | EP 2923555 A1 * | 9/2015 | | A01D 41/00 |
| EP | 1197134 A1 * | 4/2002 | | A01D 41/1226 |
| EP | 1564157 | 8/2005 | | |

* cited by examiner

EXPANSION DEVICE FOR A BULK MATERIAL CONTAINER

CROSS-REFERENCE TO A RELATED APPLICATION

The invention described and claimed hereinbelow is also described in German Patent Application DE 10 2014 004481.5, filed on Mar. 28, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to an expansion device for increasing the volume or capacity of a bulk material container. In particular, the invention relates to an expansion device for the grain tank of a combine harvester.

Document EP 1 564 157 A2 describes an expansion device wherein a plurality of wall panels is connected in an articulated manner to a frame formed by the grain tank of the combine harvester itself, and which can be pivoted from a position in which the wall panels rest flat against the frame and close the grain tank into a position in which the wall panels extend above the frame. Triangular connecting panels fill the gaps between the wall panels, which extend away from each other in the upward direction when in the pivoted-out position such that a container is formed, which is closed around the circumference thereof.

The volume or capacity of this conventional expansion device, however, is limited by the need to select the width of the wall panels transversely to the pivot axis thereof to be so small that two opposing wall panels in the closed position can be folded over the opening of the frame without overlapping one another. If the width were greater, then an attempt to fold the wall panels over the frame opening would be blocked by the wall panels and connecting panels impacting one another.

An expansion device for a bulk goods container is described in DE 10 2007 003 653 A1, in which the volume or capacity is increased by the use of wall panels. Each of the wall panels is formed by two segments connected to one another in a pivotable manner. An inner segment of the wall panels, which connects an outer segment to the frame in each case, assumes a substantially horizontal orientation when in the pivoted-out position. As a result, although the dimensions of the expansion device can be markedly increased in the horizontal direction, this produces regions from which bulk material can no longer easily flow toward the frame when the device is emptied. Therefore, in order to empty the expansion device completely, auxiliary means such as a fluidization device are required or movements of the segments must be directed into a position in which the bulk material flows out completely.

SUMMARY OF THE INVENTION

The present invention overcomes the shortcomings of known arts, such as those mentioned above.

To that end, the present invention provides an expansion device for a bulk material container, which reaches a large volume or capacity without this complicating the emptying thereof.

In an embodiment, the invention provides an expansion device for a bulk material container comprising a frame, a plurality of wall panels that are connected to the frame in an articulated manner that can be pivoted outwardly and in a pivoted-out position delimit an interior space of the expansion device, connecting elements that are each connected in an articulated manner to adjacent wall panels at two edges of the connecting elements and first expansion elements that are connected in an articulated manner to an upper edge of the wall panels and can be pivoted between a position resting against the wall panels and a position that extends the wall panels.

Flexible membrane elements are tensioned between the first expansion elements in the position that extends the wall panels. The expansion elements and the membrane elements connecting these make it possible, when in the pivoted-out position thereof, to extend the bulk material container in the upward direction without increasing the horizontal dimensions thereof. Same can prevent regions from forming in the expansion device that cannot be emptied without auxiliary means. The flexible membrane elements do not obstruct the pivoting of the expansion elements and, once the tensioned state is reached, nevertheless form a wall, which securely delimits the interior space and is loadable.

The membrane elements are advantageously reinforced in a low-stretch manner by at least one tension element in each case. In particular, such a tension element extends along an upper edge of the membrane element. The tension element is designed, in particular, as a flat belt, a flat strip or a cable.

Ends of the tension element are preferably fastened to adjacent expansion elements. Such a tension element is wrapped around by a membrane blank of the membrane element.

Preferably, the flexible membrane element extends between the wall panels proceeding from the first expansion elements instead of the connecting elements.

Furthermore, second expansion elements are advantageously connected in an articulated manner to an upper edge of the connecting elements and are connected to an adjacent first expansion element in each case via one of the flexible membrane elements.

The second expansion elements are acted upon by springs so as to assume a position resting against the connecting elements. In order to pivot the second expansion elements away from the connecting elements when the expansion device is in the pivoted-out position, all that is necessary is the pull exerted upon said second expansion elements by the first expansion elements via the membrane elements.

An actuator is advantageously assigned to each first expansion element acts on the first expansion element in order to initiate a pivoting movement of the first expansion element from the position thereof resting against the wall panel that supports said expansion element into the position that lengthens the wall panel. Such an actuator does not necessarily have to be able to generate a drive force in the opposite direction; it can suffice for the springs acting on the second expansion elements to also pull adjacent first expansion elements if these are no longer fixedly held in the position in which the wall panel is lengthened.

Such an actuator is preferably mounted on the wall panel that supports the applicable first expansion element and can be moved together therewith.

Such an actuator is preferably disposed, in particular, on an inner side of the wall panel, which faces the interior space, on the other side of a joint that connects the wall panel to a connecting element, i.e., in a region of the inner side that is located outside of the actual interior space and does not come into contact with the bulk material. Such an arrangement is suitable, in particular, on those wall panels that come to rest at the very top in a closed position of the expansion device folded over the frame.

The actuator also can be disposed on an outer side of the wall panel, preferably in the center. Such a central placement saves space, in particular, when the actuator is mounted on a wall panel that comes to rest at the very bottom when the expansion device is in the closed position. The actuator is then located between the mutually facing edges of the wall panels that are lying on the very top.

The membrane elements are connected to the adjacent expansion elements by continuous hinges in each case. This is advantageous when a membrane blank of the applicable membrane element is made of a moderately flexible material, which can fatigue as a result of frequent and sharp bending. When the material of the membrane element is flexible enough, such a membrane element can be fastened so as to rest flat against an adjacent expansion element.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
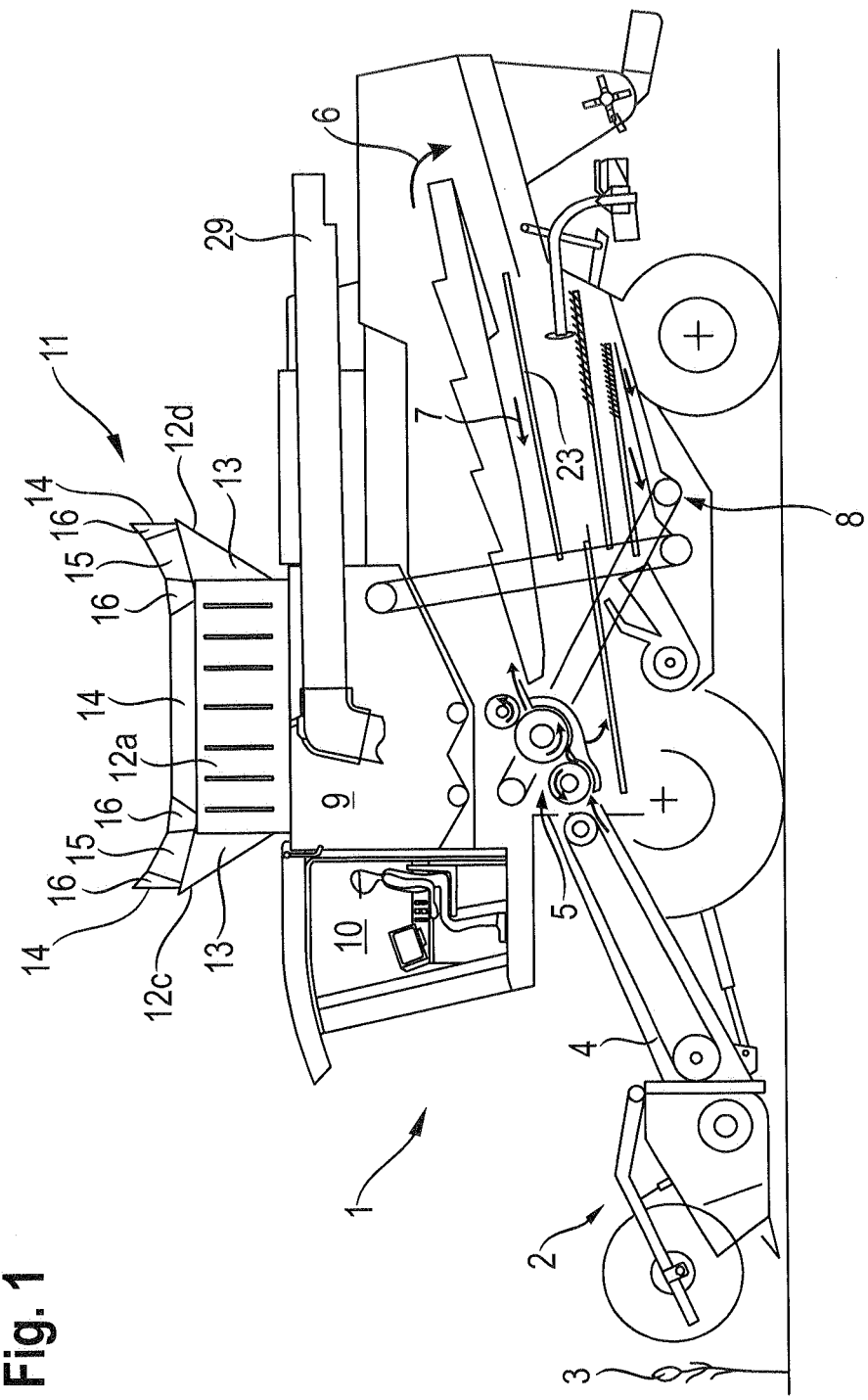
FIG. 1 presents a side view of a combine harvester that includes a grain tank expanded by a device according to the invention.

FIG. 1 presents a side view of a combine harvester 1 that includes a grain tank expanded by a device according to the invention. Crop 3 that is picked up by a header 2 of the combine harvester 1 reaches a threshing mechanism 5 via a feed rake 4. A stream 6 of threshed stalks is ejected at the rear of the combine harvester 1, while a grain-chaff mixture 7 is fed to a cleaning device 8 and grain that is separated out of the mixture 7 is conveyed into a grain tank 9 located directly behind a driver's cab 10 of the combine harvester 1.

An expansion device 11 for the grain tank 9 is mounted on the roof of the body of the combine harvester 1 and is connected to the grain tank 9 through an opening in the roof. Four wall panels 12a, 12b, 12c, 12d are pivotably mounted on a frame, which encloses the opening. In the pivoted-out position of the wall panels 12a-d, as shown in FIG. 1, the wall panels extend away from one another in the upward direction such that these delimit an interior space of the expansion device 11 having the shape of an inverted truncated pyramid and widening in the upward direction. The slant of the wall panels 12a-d relative to the horizontal is at least 30° in order to ensure that the entire content of the expansion device 11 slides down into the grain tank 9 when the grain tank 9 is emptied, without the need for additional assistance by swivelling the wall panels, inducing vibrations, or the like.

Figure 2:
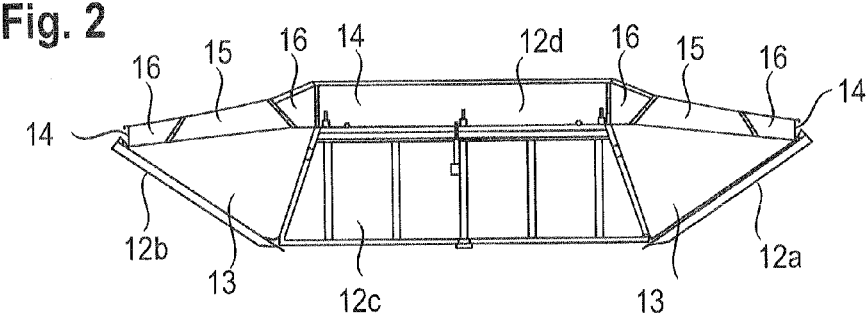
FIG. 2 presents a front view of an expansion device of the invention.

The side wall panels 12a, 12b are rectangular, as shown in FIG. 1, by the wall panel 12a; the front and rear wall panels 12c, 12d have the shape of trapezoids that become narrower in the upward direction, as is evident in FIG. 2. The wall panels 12a-d are connected to one another at mutually adjacent, side edges by connecting elements 13. The connecting elements 13 are designed as substantially triangular, rigid connecting panels 13 that connect the wall panels 12a-d to one another in an articulated manner. As an alternative, the connecting elements 13 are made of a flexible material, which allows the connecting elements 13 to be folded up and/or compressed when the expansion device 11 is collapsed. The connecting elements 13 are preferably made of a flexible flat material such as a tough plastic film or a fabric, preferably a fabric-plastic laminate in the manner of a truck tarpaulin.

One each of four first expansion elements 14 is connected in an articulated manner to each one of the four wall panels 12a-d along the upper edge thereof in the embodiment shown. The expansion elements 14 are oriented vertically in the pivoted-out position of the expansion device 11 shown in FIGS. 1 and 2. As is the case with the wall panels 12a-d, the first expansion elements 14 are made of a flexurally resistant, flat material, typically steel sheet.

In the embodiment of the expansion device 11 shown here, plate-shaped, flexurally resistant, second expansion elements 15 are also connected in an articulated manner to the upper edges of the connecting panels 13, and intermediate spaces between the first expansion elements 14 and the second expansion elements 15 are each filled by flexible membrane elements 16 such that the first and second expansion elements 14 and 15, respectively, and the membrane elements 16 form a ring that is closed all the way around and extends the interior space of the expansion device 11 in the upward direction.

Figure 10:
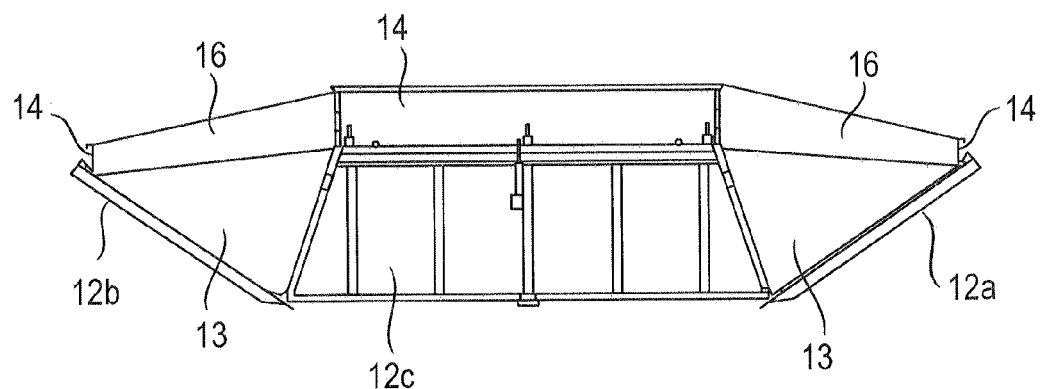
FIG. 10 presents a front view of the expansion device according to the invention.

In a simplified embodiment, the second expansion elements 15 could be eliminated and the first expansion elements 14 directly connected to one another by the flexible membrane elements 16. This embodiment is illustrated in FIG. 10, which shows a front view of the expansion device according to a different embodiment. As shown in FIG. 10, the respective membrane element 16 adjoins, via the lower edge thereof, the respective connecting element 13 between the wall panels 12a-d. The side edges of the respective membrane element 16 are connected to the respective first expansion elements 14. For the rest, the design of the expansion device 11 does not differ from the other embodiments, which are described below.

According to a non-illustrated simplified embodiment, instead of the second expansion elements 15, it is the connecting elements 13 made of flexible material that connect mutually adjacent wall panels 12a-d as well as mutually adjacent, first expansion elements 14 to one another.

The upper edges of the first expansion elements 14 and of the second expansion elements 15 and of the membrane elements 16 describe a downwardly hanging curve, as shown in the side view in FIG. 1, whereas the curve arches upward in the front view shown in FIG. 2. The reason therefor is that the width of the expansion device 11 in the pivoted-out position is greater than the length thereof, and the upper edges of the first and the second expansion elements 14, 15, respectively, which are raised at the front and the rear, make it possible for a heaped cone to form in the expansion device 11, the peak of which extends past the upper edges of the first and the second expansion elements 14, 15, respectively, and the flanks of which reach the first and the second expansion elements 14, 15, respectively, just underneath the upper edge thereof in each case.

Figure 3:
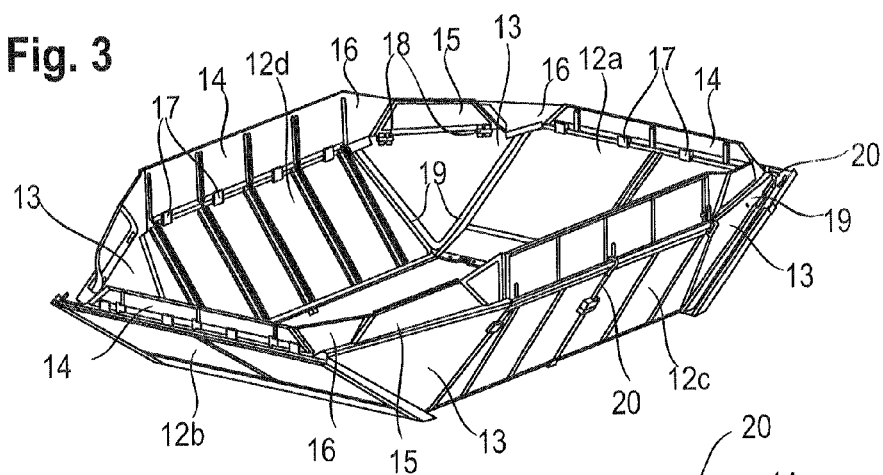
FIG. 3 presents a perspective view of the expansion device in a pivoted-out position.

FIG. 3 shows the expansion device 11 in a perspective view. Hinges 17, 18 are evident at the upper edges of the wall panels 12a, 12d and the connecting panel 13 located therebetween, by which hinges the wall panels 12a, 12d and the connecting panels 13 are connected in an articulated manner to the respective first expansion elements 14 and second expansion elements 15 thereof, respectively. The hinges 18 on the connecting panel 13 are acted upon by springs in order to drive the second expansion element 15 into a position lying flat against the inner side of the connecting panel 13. The second expansion element 15 is trapezoidal and is tapered upward such that said second expansion element can find space when in the position resting against the second expansion element 15 without extending past continuous joints (hinges) 19 thereof. Continuous joints (hinges) 19 form side edges and can therefore reach the flush position without impacting the adjacent wall panels 12a, 12d, In the pivoted-out position that is shown, the second expansion element 15 is prevented from reaching this flush position by the membrane elements 16, which are tautened between said second expansion 15 element and the adjacent first expansion elements 14, as shown.

The first expansion elements 14 are held in the upright position thereof by means of four actuators 20, in the embodiment shown. Of these four actuators 20, only the actuator on the wall panel 12a and the actuator on the wall panel 12c are visible in FIG. 3, where the other two of the four actuators (which are not visible in FIG. 3), are disposed on the wall panels 12b, 12d thereof, as respective mirror images of the actuators on wall panels 12a and 12c as shown. The actuator 20 that is located on an inner side of the wall panel 12a on the other side of the connecting panel 13, which is connected in an articulated manner to the wall panels 12a, 12c. The arrangement ensures that the actuator cannot come into contact with grain that is accommodated in the expansion device 11, which could adversely affect the function of said actuator. The actuator 20 on wall panels 12c and 12d are disposed in the center on the outer side of the wall panels.

Figure 4:
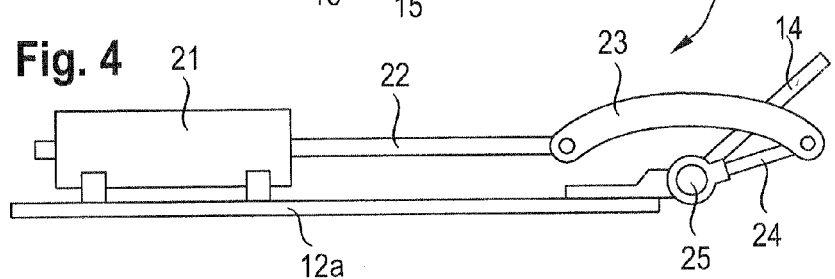
FIG. 4 presents a schematic representation of an actuator for driving a pivoting movement of expansion elements of the expansion device.

The design of the actuators is identical and is depicted schematically in FIG. 4. Mounted on the wall panels that support the actuators (which is labelled in general as 12a, 12b, 12c, 12d in FIG. 4, making clear that the actuators may be mounted on any or all of the panels) is an electric motor 21, a rotor of which has an internal thread, which meshes with a threaded rod 22 such that a rotation of the rotor drives a translation of the threaded rod 22. A control arm 23 is pivotably connected to the threaded rod 22 and to an arm 24. The arm 24 is coupled to a shaft 25, on which an expansion element 14 is mounted. When the threaded rod 22 is driven by the electric motor 21 to undergo a translation toward the left, one of the first expansion elements 14 pivots in the counterclockwise direction until the first expansion element rests against the wall panel (any of wall panels 12a-d). The first expansion element is pivoted outwardly again by means of a rotation of the motor in the opposite direction, wherein the respectively adjacent second expansion elements 15 are carried along via the membrane elements 16 against the force of the springs in the hinges 18.

Figure 5:
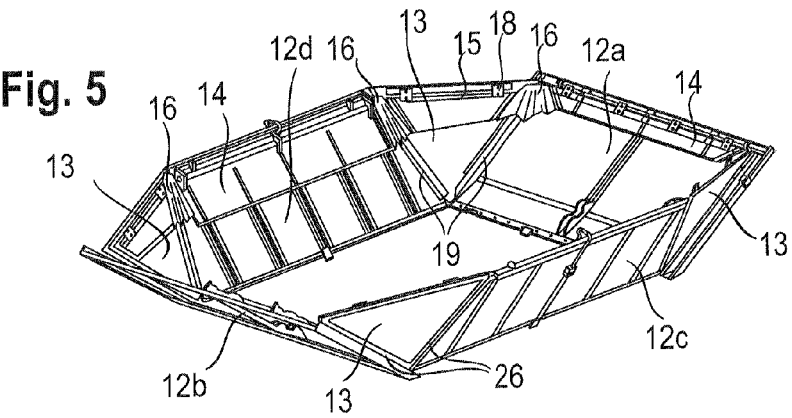
FIG. 5 presents a perspective view of the expansion device in a partially pivoted-out position.

FIG. 5 shows the expansion device 11 in a partially pivoted-out position, in which the wall panels 12a-d and connecting panels 13 assume the same positions as in FIG. 3, but the first expansion elements 14 and the second expansion elements 15 are pivoted against the respective wall panels 12a-d and connecting panels 13 thereof. The membrane elements 16 are no longer under tension and can be folded.

Figure 6:
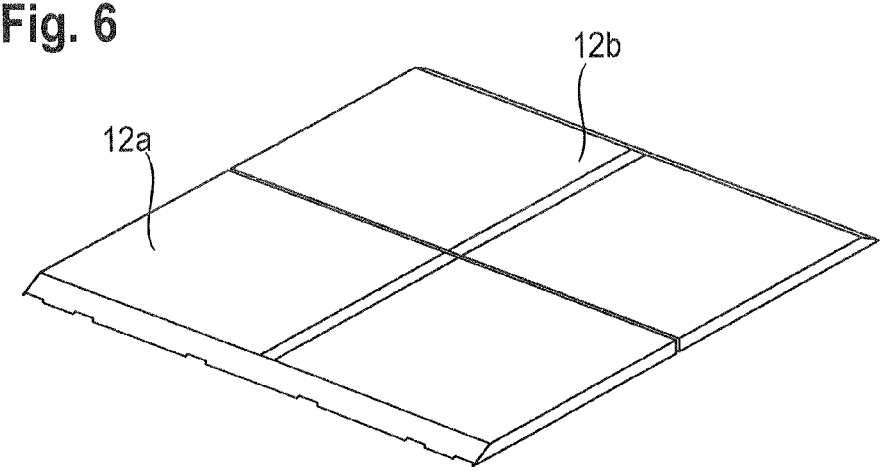
FIG. 6 presents a perspective view of the expansion device in the closed position.

In order to fold the expansion device 11 into the closed position in order to reduce the height of the combine harvester 1 for driving on public roads, for example, proceeding from the configuration shown in FIG. 5, the two trapezoidal wall panels 12c, 12d are initially folded toward one another, wherein the wall panels and connecting panels pivot toward one another along the continuous joints (hinges) 19 that connect the wall and connecting panels along the side edges thereof. The wall panels 12a, 12b are thereby initially pivoted outwardly; after the wall panels 12c, 12d pass through a vertical position, the wall panels 12a, 12b follow the inward movement of the wall panels 12c, 12d until the configuration shown in FIG. 6 is reached. The trapezoidal wall panels 12c, 12d have disappeared completely under the rectangular wall panels 12a, 12b (FIG. 6), where two the actuators 20 are located in a protected position underneath the wall panels 12a, 12d, and the other two of the actuators 20 find space in a gap 26 (FIG. 5) between the opposing upper edges of the wall panels 12a, 12b.

Figure 7:
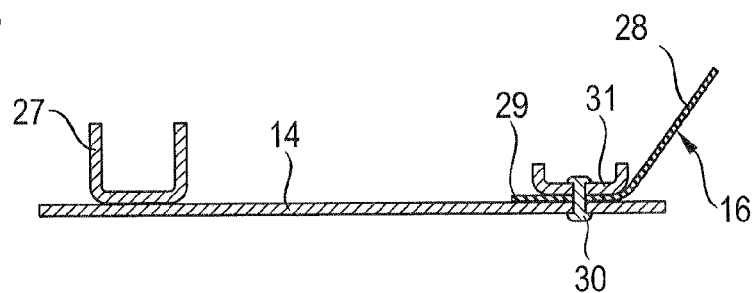
FIG. 7 presents a cross-sectional view through a wall panel and a membrane element fastened to a panel.

FIG. 7 shows a first example of a connection between an expansion element, which in this case is one of the first expansion elements 14 respectively, reinforced by U-shaped profiles 27 and a membrane element 16. The membrane element 16 comprises a membrane blank 28 made of flexible, flat material such as a tough plastic film or a fabric. The membrane blank 28 preferably is made of a fabric-plastic laminate in the manner of a truck tarpaulin. An edge 29 of the membrane blank 28 is fastened at the edge of one of the four expansion elements 14 in a flush manner by adhesive, screws, or rivets 30. Preferably, a large-area clamping between the first expansion element 14 and a profile 31 fixed thereon is implemented by screws or rivets 30.

Figure 8:
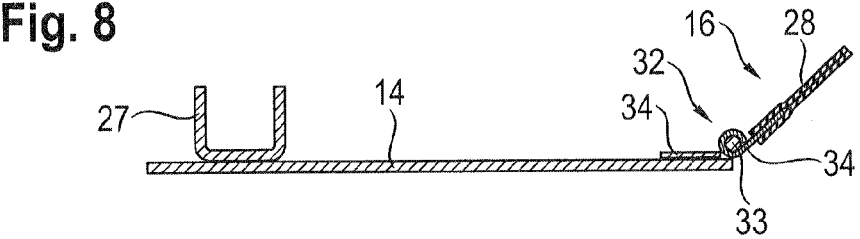
FIG. 8 presents a cross-sectional view through a wall panel and a membrane element fastened to a panel.

When it is necessary to use a blank made of flat material that is stronger but less flexible in order to achieve the necessary mechanical loadability of the membrane element 16, even though the flat material could become damaged by repeated bending along the edge of the profile 31, the connection of the membrane elements 16 to the first expansion elements 14 and the second expansion elements 15 also can be implemented via a hinge, for example, by a continuous hinge 32, as shown in FIG. 8. The two single joints 34 are held together by a hinge pin 33, where one of the two single joints 34 is fastened to the first expansion element 14 and the other is fastened to the membrane blank of membrane element 16. As shown in FIG. 8, the single joint 34 on the membrane-element 16 side is embedded between two layers of the membrane blank and is fastened to the membrane blank by bonding, sewing, riveting, or the like.

Figure 9:
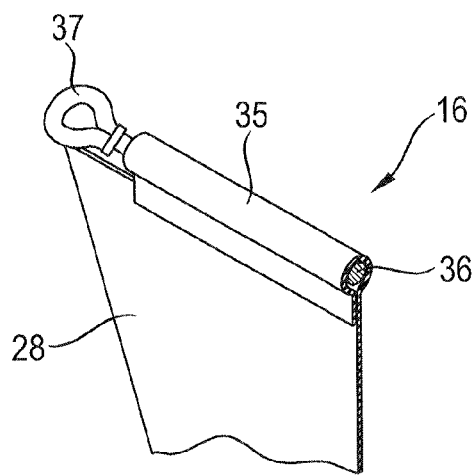
FIG. 9 presents a partially perspective, partially exposed view of a membrane element.

In order to ensure that the membrane elements 16 have the necessary tensile loadability and tensile strength when in the pivoted-out position, it is desirable that the membrane elements 16 are reinforced, at least along the upper edge thereof, by a tension mechanism, such as a flat belt, a flat strip, or a cable. FIG. 9 shows a perspective view of a corner of such a membrane element 16, in which the membrane blank is wrapped around a steel cable 36 along an upper edge 35 of the membrane element 16. The steel cable 36 overhangs the membrane blank at both ends of the steel cable in order to permit the steel cable 36 to be fastened to an adjacent first expansion element 14 or a second expansion element 15. In the case shown, the end of the steel cable 36 is formed into a loop 37, which can be screwed or riveted on the adjacent first expansion element 14 or second expansion element 15 or, if a continuous hinge 32 is used (see FIG. 8), can be drawn onto a tip of the hinge pin 33 that overhangs the single joint 34.

REFERENCE CHARACTERS 1 combine harvester
2 header
3 crop
4 feed rake
5 threshing mechanism
6 stream
7 grain-chaff mixture
8 cleaning mechanism
9 grain tank
10 driver's cab
11 expansion device
12a-d wall panel
13 connecting element
14 first expansion element
15 second expansion element
16 membrane element
17 hinge
18 hinge
19 continuous joint or hinge
20 actuator
21 electric motor
22 threaded rod
23 control arm
24 arm
25 shaft
26 gap
27 U-shaped profile
28 membrane blank
29 edge
30 rivet
31 profile
32 continuous hinge
33 hinge pin
34 single joint
35 upper edge
36 steel cable
37 eyelet As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester including an expansion device for a bulk goods container, the expansion device comprising:
   a frame;
   a plurality of wall panels that are connected to the frame in an articulated manner to pivot outwardly such that a pivoted-out position delimit an interior space of the expansion device;
   connecting elements that are connected in an articulated manner to the wall panels at two edges of each of the connecting elements; and
   first expansion elements that are connected in an articulated manner to an upper edge of the wall panels and are configured to pivot between a position resting against the wall panels and a position that extends the wall panels;
   wherein in the position extending the wall panels, flexible membrane elements are tensioned between the first expansion elements;
   wherein the flexible membrane elements are reinforced by repsective cables along an upper edge of the flexible membrane elements; and
   wherein ends of the cables positioned along the upper edges of flexible membrane elements are fastened to adjacent expansion elements of the first expansion elements.

2. An expansion device for a bulk goods container, comprising:
   a frame;
   a plurality of wall panels that are connected to the frame in an articulated manner to pivot outwardly such that a pivoted-out position delimit an interior space of the expansion device;
   connecting elements that are connected in an articulated manner to the wall panels at two edges of each of the connecting elements; and
   first expansion elements that are connected in an articulated manner to an upper edge of the wall panels and are configured to pivot between a position resting against the wall panels and a position that extends the wall panels;
   wherein in the position extending the wall panels, flexible membrane elements are tensioned between the first expansion elements;
   wherein the flexible membrane elements are reinforced by respective cables along an upper edge of the flexible membrane elements; and
   wherein ends of the cables positioned along the upper edges of flexible membrane elements are fastened to adjacent expansion elements of the first expansion elements.

3. The expansion device according to claim 2, wherein in the pivoted-out position, the wall panels are slanted by at least 30° relative to a horizontal axis of the frame.

4. The expansion device according to claim 2, wherein the flexible membrane elements include membrane blanks and wherein the cable associated with each of the flexible membrane elements is wrapped surrounded by the membrane blank.

5. The expansion device according to claim 2, wherein the flexible membrane elements comprise a lower edge and extend between the first expansion elements; and wherein the lower edge of each of the flexible membrane elements adjoins a respective one of the connecting elements.

6. The expansion device according to claim 2, further comprising second expansion elements connected in an articulated manner to an upper edge of the connecting elements and connected to an adjacent first expansion element in each case via one of the flexible membrane elements.

7. The expansion device according to claim 6, wherein the second expansion elements are acted upon by springs to assume a position resting against the connecting elements.

8. The expansion device according to claim 6, where at least one of the membrane elements is connected to one of the first and second adjacent expansion element by a continuous hinge.

9. The expansion device according to claim 2, wherein at least one actuator acts on one of the first expansion elements to initiate a pivoting movement of the first expansion element from the position of resting against the wall panel that supports the expansion element into the position that extends the wall panel.

10. The expansion device according to claim 9, wherein the at least one actuator is mounted on the wall panel carrying the first expansion element.

11. The expansion device according to claim 10, wherein the actuator is disposed on an inner side of the wall panel that faces the interior space, on the other side of a continuous joint that connects the wall panel to the connecting panel.

12. The expansion device according to claim 10, wherein the at least one actuator is disposed on an outer side of the wall panel.

13. The expansion device according to claim 2, wherein at least one of the membrane elements is connected to an adjacent expansion element by a continuous hinge.

* * * * *